US012338581B2

(12) United States Patent
Brindle et al.

(10) Patent No.: US 12,338,581 B2
(45) Date of Patent: Jun. 24, 2025

(54) NOISE DAMPER AND A METHOD FOR PRODUCING A NOISE DAMPER

(71) Applicant: Trelleborg Retford Limited, Tewkesbury (GB)

(72) Inventors: Philip Brindle, Ely (GB); Andrew Williams, Oldham (GB); Rajiv Daudia, Leicester (GB)

(73) Assignee: Trelleborg Retford Limited, Tewkesbury (GB)

( * ) Notice: Subject to any disclaimer, the term of this patent is extended or adjusted under 35 U.S.C. 154(b) by 930 days.

(21) Appl. No.: 17/435,107

(22) PCT Filed: Mar. 3, 2020

(86) PCT No.: PCT/EP2020/055542
§ 371 (c)(1),
(2) Date: Aug. 31, 2021

(87) PCT Pub. No.: WO2020/182537
PCT Pub. Date: Sep. 17, 2020

(65) Prior Publication Data

US 2022/0127793 A1 Apr. 28, 2022

(30) Foreign Application Priority Data

Mar. 8, 2019 (EP) .................................... 19161670

(51) Int. Cl.
*E01B 19/00* (2006.01)
*G10K 11/165* (2006.01)

(52) U.S. Cl.
CPC .......... *E01B 19/003* (2013.01); *G10K 11/165* (2013.01)

(58) Field of Classification Search
CPC ...... E01B 19/00; E01B 19/003; E01B 19/006; E01B 19/62; E01B 13/00; G10K 11/165
See application file for complete search history.

(56) References Cited

U.S. PATENT DOCUMENTS

| | | | |
|---|---|---|---|
| 3,568,195 | A | 3/1971 | Wesch et al. |
| 4,538,151 | A | 8/1985 | Hatakeyama et al. |

(Continued)

FOREIGN PATENT DOCUMENTS

| | | | |
|---|---|---|---|
| CA | 2919935 | C | 8/2018 |
| CN | 105568781 | A | 5/2016 |

(Continued)

OTHER PUBLICATIONS

Cotts, Sara , "Fundamentals of Polymer Rheology", XP055867981, Cuicar Greenville SC, Sep. 26, 2016, 25 Pages.

(Continued)

*Primary Examiner* — Jason C Smith
(74) *Attorney, Agent, or Firm* — Flaster Greenberg P.C.

(57) ABSTRACT

A noise damper for reducing noise from a vibrating element which vibrates at a vibrational frequency, wherein the noise damper is configured to be in contact with the vibrating element such that when the noise damper is in contact with the vibrating element a noise amplitude at a point in a surrounding of the vibrating element is given by an attenuation factor times the noise amplitude at the point in the surrounding when the noise damper is disconnected from the vibrating element, the noise damper comprising: a polymer matrix, the polymer matrix being in a solid phase and forming a shape; a plurality of hollow particles dispersed in the polymer matrix, each hollow particle having a shell encapsulating a gas filled cavity, each hollow particle having a hollow particle size, and the plurality of hollow particles being dispersed at a hollow particle concentration in the polymer matrix; wherein the hollow particle size and the hollow particle concentration are configured to set the attenuation factor below an attenuation factor threshold at the vibrational frequency of the vibrating element, the (Continued)

hollow particle size being in a range wherein the largest dimension is between 20 μm and 2000 μm.

20 Claims, 7 Drawing Sheets

(56) References Cited

U.S. PATENT DOCUMENTS

| | | | | |
|---|---|---|---|---|
| 5,109,039 | A | 4/1992 | Eisner | |
| 6,588,677 | B2 * | 7/2003 | Hofstetter, Sr. | E01B 9/62 238/382 |
| 6,729,373 | B2 * | 5/2004 | Yukawa | B60C 19/002 152/450 |
| 7,182,114 | B2 * | 2/2007 | Yukawa | B60C 19/002 152/450 |
| 7,188,649 | B2 * | 3/2007 | Ishida | B60C 17/06 152/158 |
| 7,234,647 | B2 * | 6/2007 | Wirthwein | E01B 19/003 238/382 |
| 7,263,028 | B2 * | 8/2007 | Thomas | B32B 5/16 181/290 |
| 7,886,789 | B2 * | 2/2011 | Yukawa | B60C 19/002 152/450 |
| 8,172,158 | B1 * | 5/2012 | Burkhardt | E01B 19/003 238/2 |
| 8,985,476 | B1 * | 3/2015 | O'Connell | E01B 19/00 238/8 |
| 10,864,782 | B2 * | 12/2020 | Yurjevich | B60C 19/002 |
| 11,440,357 | B2 * | 9/2022 | Baker | B29D 30/0061 |
| 12,054,013 | B2 * | 8/2024 | Nakatani | B60C 1/00 |
| 12,091,822 | B2 * | 9/2024 | Müller et al. | G10K 11/17873 |
| 2001/0004924 | A1 * | 6/2001 | Aoki | B60C 29/062 156/394.1 |
| 2006/0072372 | A1 * | 4/2006 | Thomas | G10K 11/168 367/1 |
| 2009/0206169 | A1 | 8/2009 | Andre | |
| 2009/0277551 | A1 * | 11/2009 | Yukawa | B60C 19/002 152/450 |
| 2013/0017096 | A1 | 1/2013 | Holley | |
| 2013/0135135 | A1 | 5/2013 | Appleton | |
| 2014/0118177 | A1 | 5/2014 | Appleton | |
| 2019/0030954 | A1 * | 1/2019 | Nakatani | B60C 11/0041 |
| 2020/0087864 | A1 * | 3/2020 | Ellis | E01B 29/32 |
| 2021/0252919 | A1 * | 8/2021 | Nakatani | C08K 3/36 |
| 2022/0127793 | A1 * | 4/2022 | Brindle | E01B 19/003 |

FOREIGN PATENT DOCUMENTS

| | | | | |
|---|---|---|---|---|
| CN | 105735057 | A | 7/2016 | |
| CN | 105908581 | A * | 8/2016 | E01B 19/003 |
| DE | 4137545 | A1 * | 5/1993 | G10K 11/16 |
| DE | 4411833 | A1 | 10/1994 | |
| DE | 10215255 | A1 * | 10/2003 | E01B 19/00 |
| DE | 102010055850 | A1 | 6/2012 | |
| DE | 202017103752 | U1 * | 11/2017 | B60K 17/22 |
| EP | 1400628 | A2 | 3/2004 | |
| EP | 1236924 | B1 * | 10/2005 | F16F 7/015 |
| EP | 2354300 | A1 | 8/2011 | |
| EP | 2554617 | A2 * | 2/2013 | B29D 30/00 |
| EP | 2457749 | B1 * | 12/2013 | B29D 30/0662 |
| EP | 2529205 | B1 | 6/2018 | |
| EP | 3406461 | B1 * | 8/2020 | B60C 1/00 |
| FR | 2834540 | A1 * | 7/2003 | B32B 15/08 |
| GB | 1074898 | A | 7/1967 | |
| GB | 2526795 | A | 12/2015 | |
| JP | 7135863 | B2 * | 9/2022 | B60C 1/0008 |
| JP | 2022137927 | A * | 9/2022 | B60C 19/002 |
| WO | WO-9915732 | A1 * | 4/1999 | E01B 19/003 |
| WO | 2004033795 | A1 | 4/2004 | |
| WO | WO-2008043249 | A1 * | 4/2008 | E01B 19/003 |
| WO | 2009128707 | A1 | 10/2009 | |
| WO | 2011051687 | A2 | 5/2011 | |

OTHER PUBLICATIONS

Green , et al., "Ferric metal-organic framework 9fe-MOF) for Microwave Absorption", Manuscript (made available under Elsevier user license), 2018, 26 pages.

Manna , et al., "Fe3O4@Carbon@Polyaniline Trilaminar Core-Shell Composites as Superior Microwave Absorber in Shielding of Electromagnetic Pollution", ACS Sustainable Chem. Eng. 2017, 5, 2017, 10710-10721.

Montazeri , et al., "Separatation of the defect-free Fe3O4—Au core/shell fraction from magnetite-gold composite nanoparticles by an acid wash treatment", Journal of Nanostructure in Chemistry 2013 3:25, Apr. 30, 2013, 6 pages.

Saini , et al., "Tensile Properties of Highly Filled Magnetic Polymeric Composites", Journal of Composite Materials, vol. 21, Sep. 1987, 16 pages.

Yin , et al., "Enhanced high-frequency absorption off anisotropicFe3O4/graphene nanocomposites", Scientific Reports [6:25075] DOI:10.1038/srep25705, May 4, 2016, 10 pages.

Zhao, Caiyou , et al., "A detailed experimental study of the validity and applicability of slotted stand-off layer rail dampers in reducing railway vibration and noise", Journal of Low Frequency Noise, Vibration and Active Control, vol. 37, No. 4, XP05586802, Dec. 1, 2018, pp. 896-910.

"3M Glass Bubbles iM16K", 3M, Energy and Advanced Materials Division; Experimental Product Information, 2016, 2 pages.

"Engineered Hollow Shells for Industrial, Commercial, and Military Applications", Deep Springs Technology Brochure; https://www.trelleborg.com/en/applied-technologies, Jun. 14, 2016, 4 pages.

Li , et al., "Development of High Density Syntactic TPU Foam by Incorporation of Expancel Through Extrusion", SPE ANTEC, Anaheim, 2017, 5 pages.

Pallas , et al., "Tram noise emission: spectral analysis of the noise source contributions", www.acoustics08-paris.org, Jun. 29-Jul. 4, 2008, pp. 2863-2868.

Panulinova , et al., "Tram Squealing Noise and It's Impact on Human Health", Noise & Health; 18(85), Nov.-Dec. 2016, 329-337.

Yalcin , et al., "3M Glass Bubbles iM16K for Reinforced Thermoplastics", 3M Advanced Materials Division; Technical Paper, Oct. 2016, 5 pages.

Dumitriu, Madalina, et al., On the Rolling Noise Reduction by Using the Rail Damper:, Journal of Engineering Science and Technology Review, vol. 10, No. 6, Jan. 1, 2017, pp. 87-95.

Cheng, F. et al., 'Preparation and properties of foamed cellulose-polymer microsphere hybrid materials for sound absorption', BioResources, vol. 11, No. 3, 12 Pages.

Zhou, H. et al., 'Sound absorption characteristics of polymer microparticles', Journal of Applied Polymer Science, vol. 101, No. 4, 5 Pages.

* cited by examiner

NOISE DAMPER AND A METHOD FOR PRODUCING A NOISE DAMPER

CROSS-REFERENCE TO RELATED APPLICATIONS

This application is the 371 National Stage of International Application No. PCT/EP2020/055542, filed Mar. 3, 2020, which claims the priority to European Application No. 19161670.5, filed Mar. 8, 2019, the disclosures of which are incorporated herein by reference in their entireties.

TECHNICAL FIELD

The present invention relates generally to noise dampers and, more particularly, to noise dampers for railway tracks.

BACKGROUND

Noise is an unwanted vibration through a medium whereby oscillations with an amplitude and a frequency occur in the medium. Noise may be acoustic noise, e.g. an unwanted sound wave wherein the air pressure oscillates, or mechanical noise, e.g. an unwanted mechanical wave wherein solid matter oscillates. Noise originates from vibrations in a vibrating element which subsequently is transmitted to the surrounding medium. For example, as sound waves in air in the surrounding of the vibrating element or as mechanical waves in solid matter in the surrounding of the vibrating element, e.g. in solid matter in contact with the vibrating element. Damping is an effective way of reducing noise where vibrational energy may be converted to heat using a noise damper.

An example of a noise damper is a railway track noise damper, such as e.g. a rail boot. In the following the term "railway" will be used to refer to all forms of railway transport, including both trains and trams. A railway track noise damper may comprise a polymer structure between the railway track and the ground such that vibrations originating from the railway track may be attenuated, wherein the railway track is the vibrational element.

It is known that the elastic properties of the noise damper are important and that these may be tuned depending on the intended use of the noise damper. An example of prior art is EP2354300.

SUMMARY

It is an object of the invention to provide a noise damper to be in contact with a vibrating element, wherein the noise damper is customized for an expected vibrational frequency of the vibrating element. It is further an object that the noise damper is inexpensive, durable, and easy to install. These and other objects of the invention are at least partly met by the invention as defined in the independent claims. Preferred embodiments are set out in the dependent claims. In the following noise dampers will be discussed primarily using rail boots by way of example. However, it should be understood that the inventive concept relates to any noise damper. For example, a noise damper according to the inventive concept may be useful as an expansion joint, wherein the expansion joint acts as a noise damping closure for gaps such as a gap between two parts of structure, e.g. between two road segments of a bridge, between two wall segments in a building, a gap between a wall and a window in a building or a gap between a door and a frame of a car. An expansion joint placed in a gap between two parts of a structure may thus prevent mechanical noise from propagating from one part of the structure to another but it may also prevent acoustic noise from passing between the two parts of the structure. An expansion joint may thus provide a flexible connection between the two segments while allowing the two segments to move with respect to each other. A noise damper according to the inventive concept may also be useful as a noise damper for automotive or marine components.

According to a first aspect of the invention, there is provided a noise damper for reducing noise from a vibrating element which vibrates at a vibrational frequency, wherein the noise damper is configured to be in contact with the vibrating element such that when the noise damper is in contact with the vibrating element a noise amplitude at a point in a surrounding of the vibrating element is given by an attenuation factor times the noise amplitude at the point in the surrounding when the noise damper is disconnected from the vibrating element, the noise damper comprising:

a polymer matrix, the polymer matrix being in a solid phase and forming a shape;

a plurality of hollow particles dispersed in the polymer matrix, each hollow particle having a shell encapsulating a gas filled cavity, each hollow particle having a hollow particle size, and the plurality of hollow particles being dispersed at a hollow particle concentration in the polymer matrix;

wherein the hollow particle size and the hollow particle concentration are configured to set the attenuation factor below an attenuation factor threshold at the vibrational frequency of the vibrating element, the hollow particle size being in a range wherein the largest dimension is between 20 μm and 2000 μm.

It is an insight of the invention that by controlling the hollow particle size and concentration in the polymer matrix the noise damper may be customized to an expected vibrational frequency, thereby making the noise damper more efficient. It should be understood that various materials may be used for the shell of the hollow particles. The shell may be a polymer shell, e.g. a thermoplastic polymer shell. The shell may alternatively be made of other materials, e.g. glass or silicon carbide.

It should be understood that the vibrating element may vibrate at several frequencies or in a range of frequencies wherein the vibrational frequency is the most important frequency component to attenuate. The most important frequency component may e.g. be the dominant frequency component or the frequency component which the surrounding is most sensitive to, e.g. a resonant frequency of an element in connection to the vibrating element or a frequency within the frequency range of human hearing.

It should be understood that the vibrating element may be a structural feature in contact with the noise damper, e.g. a rail in contact with a rail boot. Herein it should be understood that the term "in contact with" in some embodiments may be construed as "attached to". It should also be understood that the vibrating element may be air in contact with the noise damper wherein the noise damper attenuates a propagating sound wave, thereby acting as an acoustic attenuator.

It should be understood that the noise amplitude may refer to the amplitude of mechanical waves in solid matter at a point in the surrounding of the vibrational element, e.g. the amplitude of an oscillating displacement of a structural feature such as the ground in the vicinity of a vibrating rail. The amplitude of the mechanical wave may herein be attenuated by the noise damper acting as part of a vibration isolation system which may attenuate the amplitude of the vibrations of the vibrating element.

It should also be understood that the noise amplitude may refer to the amplitude of a sound wave in air at a point in the surrounding of the vibrational element, e.g. a local pressure deviation from the ambient atmospheric pressure caused by the sound wave such as the sound pressure level in the vicinity of a vibrating rail. The amplitude of the sound wave at a point in the surrounding of the vibrating element may be attenuated by the absorption of the sound wave as it is transmitted through the noise damper, wherein the noise damper acts as an acoustic attenuator. The amplitude of the sound wave at a point in a surrounding of the vibrating element may also be attenuated by the noise damper acting as part of a vibration isolation system such that vibrations of the vibrating element itself is dampened, thereby preventing part of the sound wave from being created.

It should be understood that the attenuation factor may be a factor between 0 and 1. Furthermore, it should be understood that the attenuation factor threshold may be a threshold between 0 and 1. Thus setting the hollow particle size and the hollow particle concentration may ensure that the noise amplitude is sufficiently attenuated at the vibrational frequency.

It should be understood that several different combinations of hollow particle size and hollow particle concentration may result in the same attenuation factor. Configuring the hollow particle size and hollow particle concentration to set the attenuation factor below an attenuation factor threshold may thus also be done in several ways. For example, a number of noise dampers of a certain shape may be manufactured with varying hollow particle size and hollow particle concentration. The attenuation factor for a noise damper of the certain shape may then be measured, at a given vibrational frequency, as a function of the hollow particle size and the hollow particle concentration to form a graphical plot to tune the attenuation factor. The attenuation factor may in turn be based on noise regulations or noise standards. It should be understood that increasing the hollow particle size may result in a less stiff material which in turn will affect the attenuation factor. It should also be understood that increasing the hollow particle concentration may result in a similar effect. Denser materials with lower concentrations of spheres may perform better in terms of vibrational damping performance at lower frequencies and vice versa.

It is an insight of the invention that the hollow particles may form closed cells in the polymer matrix wherein the hollow particle size and concentration control the viscoelastic properties of the material, the porosity, and the cell morphology. These parameters may in turn affect how the noise damper transmits vibrations and sound as well as how the noise damper may dampen the vibrations of the vibrating element itself. In particular, these parameters may set the frequency dependency of the attenuation of the noise amplitude at a point in the surrounding of the vibrational element. Thus the attenuation factor may be set such that it is below the attenuation factor threshold at the vibrational frequency.

A noise damper comprising hollow particles dispersed in the polymer matrix may have similarities to a noise damper made of e.g. polyurethane foam. During the production of polyurethane foam a blowing agent is introduced into melted polyurethane wherein gas bubbles are formed. As the polyurethane solidifies the gas bubbles form a cellular structure. However, such a cellular structure may not be as controllable as the cellular structure of the hollow particles in the polymer matrix as the size and concentration of the gas bubbles may be very dependent on the pressure and process time during production which affect how the bubbles are formed and how they coalesce. In contrast, the shell may prevent the hollow particles from coalescing, such that that the concentration cannot change, and may define the size of the hollow particle. A size distribution may still occur but the standard deviation in the size distribution of hollow particles may be smaller than the standard deviation in the size distribution of the cells in polyurethane foam.

It should be understood that the attenuation factor may depend on other parameters than the hollow particle size and concentration. For example, the design and geometry of the noise damper may be important, as well as the viscoelastic properties of the polymer matrix. However, using the hollow particle size and concentration may be a simple and accurate way to tune the damping properties of the noise damper.

In the case of rail boots for noise damping around a tram line the vibrational frequency may e.g. vary from one tram line to another depending on the type of tram running along the line. For example, the bogie area, if the bogies are powered or unpowered etc. may have an effect on the vibrational frequency of the rail. The vibrational frequency may also vary from one position to another along the tram line. At positions where the trams have a high speed the vibrational frequency may be different from positions where the trams have a low speed. At positions where the tram line has curvature with a small radii there may be squeal noise, a high-pitched noise due to the friction between the wheel and rail created when the tram rounds the curve. At these positions the vibrational frequency of the rail may be significantly different from the vibrational frequency at straight portions of the tram line. It may thus be desirable to tune the noise damping properties of rail boots depending on which tram line it is intended for and/or which position along the train line it is intended for. According to the inventive concept rail boots for different tram lines and for different portions of the tram lines may be produced wherein all rail boots have the same shape. The hollow particle size and concentration may then be used to tune the damping properties of the different rail boots according to the specific vibrational frequency which is relevant for the individual rail boot.

Regarding the phrase "the hollow particle size being in a range wherein the largest dimension is between 20 μm and 2000 μm": it should be understood that the largest dimension of a hollow particle may be an outer diameter of the hollow particle. Consequently, the hollow particle size may be in a range wherein the outer diameter of the hollow particles is between 20 μm and 2000 μm. For spherical as well as non-spherical hollow particles the outer diameter of the hollow particle should be construed as the diameter which defines a spherical volume into which the hollow particle fits.

It should be understood that the hollow particles may be spherical, wherein the hollow particle size may refer to the outer diameter. It should also be understood that the hollow particles may have a non-spherical shape, wherein the hollow particle size may refer to the largest dimension of the hollow particle. It should also be understood that although the hollow particle size range of 20 μm to 2000 μm may be useful for a large variety of noise damping applications there may also be other ranges which are useful for particular applications. For some noise damping applications a more narrow range may be suitable for the hollow particle size, e.g. a range wherein the hollow particle size is between 75 μm and 150 μm.

It should also be understood that for some noise damping applications the hollow particle concentration may be in the range of corresponding to a volume loading of 0 to 60 volume % on the polymer matrix.

The inventive concept may facilitate inexpensive noise dampers customized for a given vibrational frequency. In the rail boot example tuning the noise damping properties by changing e.g. the design or geometry of the rail boot may be expensive as different molds would have to be used during production. Furthermore, changing the viscoelastic properties of the polymer matrix may only be possible within a limited range. In contrast, dispersing hollow particles in the polymer matrix material during the production of the rail boot may provide a simple way of tuning the noise damping properties and providing accurate control of the attenuation factor at different vibrational frequencies. The resulting rail boot may thus be inexpensive as only the polymer particle size and concentration would have to be changed in order to give different rail boots different properties.

Noise dampers according to the inventive concept may also be durable as the shell can reinforce the closed cells such that they do not collapse even when exposed to high pressure or used over a long time period. The reinforcement may furthermore contribute to a superior damping behavior at elevated pressures. Noise dampers according to the inventive concept may therefore be particularly useful when supporting heavy loads, such as e.g. a train or tram, or when used at great water depths, such as e.g. in submarines, offshore oil rigs and aerospace applications.

Noise dampers according to the inventive concept may also be easy to install. The hollow particles may provide a micro roughened surface which facilitates ease of installation by minimizing friction between ancillary components.

Noise dampers according to the inventive concept may be particularly useful for vibrational frequencies in the range of 0-500 Hz.

The noise damper may have a hollow particle size and the hollow particle concentration configured to set the attenuation factor below an attenuation factor threshold of 0.9.

In many applications, e.g. rail boot noise dampers, an attenuation factor below 0.9 is sufficient. An amplitude reduction by a factor of 0.9 for a wave may result in a power reduction by a factor of 0.8 as the power attenuation may be proportional to the amplitude attenuation squared.

The noise damper may have an attenuation factor which is frequency dependent and the hollow particle size and the hollow particle concentration may be further configured to set the attenuation factor to have a local minimum within a first vibrational interval, said first vibrational interval comprising the vibrational frequency of the vibrating element.

The first vibrational interval may be e.g. the vibrational frequency ±10% of the vibrational frequency. Tuning the local minimum of the attenuation factor close to the vibrational frequency may be advantageous as it may optimize the damping properties of the noise damper at the frequency which is most important to dampen.

The noise damper may be configured to act as an acoustic attenuator which attenuates a sound wave originating from the vibrating element as the sound wave is transmitted through the noise damper when it is in contact with the vibrating element, wherein the hollow particle size and the hollow particle concentration are further configured to set an acoustic attenuation coefficient of the noise damper above an acoustic attenuation coefficient threshold at the vibrational frequency of the vibrating element.

The pressure (P) of a sound wave transmitted from a first side to a second side of a noise damper may be described by $$P(d)=P_0e^{-\alpha d} \quad \text{Eq. 1}$$

Wherein P(d) is the sound pressure on the second side, $P_0$ is the sound pressure on the first side, $\alpha$ is the acoustic attenuation coefficient, and d is the distance between the first and the second side. By setting the acoustic attenuation coefficient of the noise damper above the acoustic attenuation coefficient threshold at the vibrational frequency of the vibrating element it is possible to ensure that with a given thickness a certain attenuation coefficient may be achieved.

The noise damper may be configured such that the acoustic attenuation coefficient of the noise damper is above an acoustic attenuation coefficient threshold which ensures that no more than 5% of the energy in a sound wave passes through a 10 mm thick noise damper.

The noise damper may also be configured such that the acoustic attenuation coefficient of the noise damper is above an acoustic attenuation coefficient threshold of 0.023 $mm^{-1}$.

In the case of expansion joints for gaps between wall or ceiling segments a 20 dB noise reduction may be sufficient to provide some degree of privacy between the two sides of the wall. A 20 dB noise reduction may correspond to a power ratio of 1/100 or an amplitude ratio of 1/10. A common thickness for expansion joints for wall and ceiling segments is 100 mm. Thus an acoustic attenuation coefficient threshold of 0.023 $mm^{-1}$ may ensure that a common thickness expansion joint provide effective noise damping performance.

The noise damper may have an acoustic attenuation coefficient which is frequency dependent and the hollow particle size and the hollow particle concentration may be further configured to set the acoustic attenuation coefficient to have a local maximum within a second vibrational interval, said second vibrational interval comprising the vibrational frequency of the vibrating element.

The second vibrational interval may be e.g. the vibrational frequency ±10% of the vibrational frequency. Tuning the local maximum of the attenuation factor close to the vibrational frequency may be advantageous as it may optimize the damping properties of the noise damper at the frequency which is most important to dampen.

The noise damper may be configured to act as a part of a vibration isolation system, the noise damper being configured to be attached to an object as well as to the vibrating element, wherein the noise damper, the vibrating element and the object together form the vibration isolation system when the noise damper is attached both to the vibrating element and the object, the vibration isolation system controlling an amplitude of vibrations transmitted from the vibrating element to the object.

The noise damper may herein be modelled as a spring with stiffness k and a dash-pot with damping coefficient C, which connect the object to the vibrating element, the spring and damper being placed in parallel. It is a realization of the invention that the hollow particle size and the hollow particle concentration may affect k and C and thereby control the properties of the vibration isolation system, e.g. the natural frequency, $f_n$, and the transmissibility, T, of the system.

The natural frequency of the vibration isolation system may be $$f_n = \frac{1}{2\pi}\sqrt{\frac{k}{m}\left(1-\left(\frac{C}{C_c}\right)^2\right)} \quad \text{Eq. 2}$$

Wherein m is the mass of the vibrating element and $C_c$ is a critical damping. In some cases the object may herein be seen as substantially heavier than the vibrating element.

The transmissibility of the vibration isolation system may be $$T = \frac{A_o}{A_i} = \sqrt{\frac{1 + \left(2\frac{f_d}{f_n}\frac{C}{C_c}\right)^2}{\left(1 - \frac{f_d^2}{f_n^2}\right)^2 + \left(2\frac{f_d}{f_n}\frac{C}{C_c}\right)^2}} \quad \text{Eq. 3}$$

Wherein $A_o$ is the amplitude of a vibrational response when the system is subjected to a vibrational input with amplitude $A_i$, and $f_d$ is the vibrational frequency of the vibrational input.

It should be understood that the vibration isolation system may have one natural frequency and one transmissibility for each degree of freedom for vibrational motion. The natural frequency and the transmissibility may thus vary from one vibrational mode to another. For example, $f_n$ and T for vibrations along one axis may be different from $f_n$ and T for vibrations along a perpendicular axis.

It should also be understood that the vibration isolation system may operate in both directions, i.e. it may also control an amplitude of vibrations transmitted from the object to the vibrating element.

The hollow particle size and hollow particle concentration may further be configured to set a natural frequency of the vibration isolation system such that the ratio between the vibrational frequency and the natural frequency of the vibration isolation system is above a frequency ratio threshold.

The transmissibility may have a peak at the natural frequency and decay for frequencies higher than the natural frequency. When $f_d/f_n<\sqrt{2}$ the vibration isolation system is in the region of amplification wherein T>1. When $f_d/f_n>\sqrt{2}$ the vibration isolation system is in the region of isolation wherein T<1. It is a realization of the invention that the hollow particle size and the hollow particle concentration may ensure that the ratio between the vibrational frequency and the natural frequency of the vibration isolation system is above a frequency ratio threshold of $\sqrt{2}$, such that the vibration isolation system is in the region of isolation. It is also a realization of the invention that the hollow particle size and the hollow particle concentration may ensure that the ratio between the vibrational frequency and the natural frequency of the vibration isolation system is above a frequency ratio threshold of $2*\sqrt{2}$, such that the vibration isolation system is well into the region of isolation.

The hollow particle size and the hollow particle concentration may further be configured to set a transmissibility of the vibration isolation system at the vibrational frequency below a transmissibility threshold, wherein the transmissibility is the ratio of an amplitude of a vibrational response and an amplitude of a vibrational input of the vibration isolation system.

The amplitude of the vibration transmitted to the object may thereby be reduced in comparison to the amplitude of the vibrating element. The transmissibility threshold may e.g. be 1. The transmissibility threshold may also be 0.9 such that the amplitude is reduced by at least 10% when the vibration passes from the vibrating element to the object. In the case of a rail boot the transmissibility threshold may be e.g. 0.2 or 0.02.

The hollow particle size and the hollow particle concentration may further be configured to set a damping ratio above a damping ratio threshold, wherein the damping ratio is the ratio between the damping coefficient and the critical damping coefficient of the vibration isolation system.

In accordance with Eq. 3 the ratio between the damping coefficient and the critical damping coefficient of the vibration isolation system may determine the magnitude of the transmissibility at the natural frequency. The magnitude of the amplification in the region of amplification may be reduced by increasing the ratio between the damping coefficient and the critical damping coefficient. Thus a damping ratio above a damping ratio threshold may ensure that the transmissibility is not too high for frequencies in the region of amplification. The maximum transmissibility, $T_{max}$, may be $$T_{max} \approx \frac{1}{2\frac{C}{C_c}} \quad \text{Eq. 4}$$

For example, the vibration isolation system may be configured such that a primary vibrational frequency of the vibrating element lies in the region of isolation on the transmissibility curve while at the same time ensuring that the damping ratio is above a damping ratio threshold of 0.1, thereby ensuring that the maximum transmissibility is 5 for secondary vibrational frequencies lying in the region of amplification. It should also be understood that the vibration isolation system may be configured for a single vibrational frequency which lies in the region of amplification wherein the damping ratio is used to ensure that the maximum transmissibility does not become too high.

The hollow particle size and the hollow particle concentration may further be configured such that the polymer matrix with the dispersed hollow particles has a tan delta between 0.1 and 15, wherein tan delta is the loss modulus divided by the storage modulus for a viscoelastic material.

The noise damper may be a rail boot, the rail boot being configured to be attached to a rail of a railroad, wherein the rail is the vibrating element.

The inventive concept may herein provide a rail boot which is inexpensive, durable, and easy to install.

The hollow particles may furthermore be temperature expandable particles wherein the hollow particle size has been set by elevating the temperature of the hollow particles to a size defining temperature during the production of the noise damper, the size defining temperature being a temperature which expands the hollow particles to a predefined size.

A noise damper wherein the hollow particles are temperature expandable particles may be inexpensive. The hollow particles may have a small size at room temperature which may reduce the cost of transport and storage. During production of the noise damper the hollow particles may be dispersed in melted polymer matrix material at the desired concentration. The temperature may be elevated to the size defining temperature such that the hollow particles expands to the desired size. Thus, accurate control of the vibration damping properties may be combined with low transport and storage costs for the hollow particles.

The noise damper may be a vibrational element clip, wherein the shape of the polymer matrix has a form which grips the vibrating element such that the vibrational element clip is configured to be attached to the vibrating element by clipping it on to the vibrating element.

Such a noise damper may be easy to install as no further means to attach it to the vibrating element. There may be no need for adhesive, screws, bolts etc. to attach the noise damper. The hollow particles may herein form a hydrophobic surface which may prevent corrosion of the vibrating element. It should be understood that the noise damper may be attached before the vibrating element starts to vibrate.

According to a second aspect of the invention, there is provided a method for producing a noise damper for reducing noise from a vibrating element which vibrates at a vibrational frequency, wherein the noise damper is configured to be in contact with the vibrating element such that when the noise damper is in contact with the vibrating element a noise amplitude at a point in a surrounding of the vibrating element is given by an attenuation factor times the noise amplitude at the point in the surrounding when the noise damper is disconnected from the vibrating element, the method comprising:

heating an amount of a polymer matrix material such that it melts and forms a melted polymer matrix material;

dispersing an amount of hollow particles in the melted polymer matrix material, wherein each hollow particle has a shell encapsulating a gas filled cavity;

shaping and cooling the melted polymer matrix material with the dispersed hollow particles such that the melted polymer matrix material solidifies into a polymer matrix with a shape, the shape comprising a plurality of the hollow particles with a hollow particle size dispersed at a hollow particle concentration in the polymer matrix;

wherein the amount of polymer matrix material and the amount of hollow particles are configured to define the hollow particle concentration in the solidified polymer matrix, and wherein the hollow particle size and the hollow particle concentration are configured to set the attenuation factor below an attenuation factor threshold at the vibrational frequency of the vibrating element.

This may be a production method which provides noise dampers which are inexpensive, durable, and easy to install.

According to the second aspect of the invention each hollow particle may a temperature expandable particle which is expandable to a size which is temperature dependent; and the method may further comprise:

elevating the temperature of the melted polymer matrix material with the dispersed hollow particles to a size defining temperature such that the hollow particles expand, wherein the size defining temperature is configured to define the hollow particle size in the solidified polymer matrix.

This production method may further reduce the cost of the noise dampers as the hollow particles may have a small size before they are dispersed in the melted polymer matrix material. Thus, the volume of the required hollow particle may be small during storage and transport, which may reduce the storage and transport costs.

According to the second aspect of the invention an extrusion process may be used for the method for producing the noise damper, in which:

the steps of heating an amount of polymer matrix material and dispersing an amount of hollow particles in the melted polymer matrix material are performed by feeding a barrel of an extruder with polymer matrix material and unexpanded hollow particles and elevating the temperature in the barrel above the melting temperature of the polymer matrix material;

the step of elevating the temperature of the melted polymer matrix material with the dispersed hollow particles to a size defining temperature is performed at an extruder die of the extruder wherein the die is a point where the melted polymer matrix material with the dispersed hollow particles leaves the extruder.

This production method may further reduce the cost of the noise dampers as the extrusion process is a high-volume manufacturing process. Another advantage may be that one long noise damper may be produced which is subsequently cut into a desired length at a later stage. Thus varying lengths of the same type of noise damper may be made in one single process.

This production method may further improve the expansion of the temperature expandable particles as the pressure may drop at the extruder die.

Noise dampers produced according to the second aspect of the invention may have the same advantages, or similar advantages, as the noise dampers encompassed by the claims in this application and may possibly be the subject of a future divisional application.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present invention are described thereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

Figure 1:
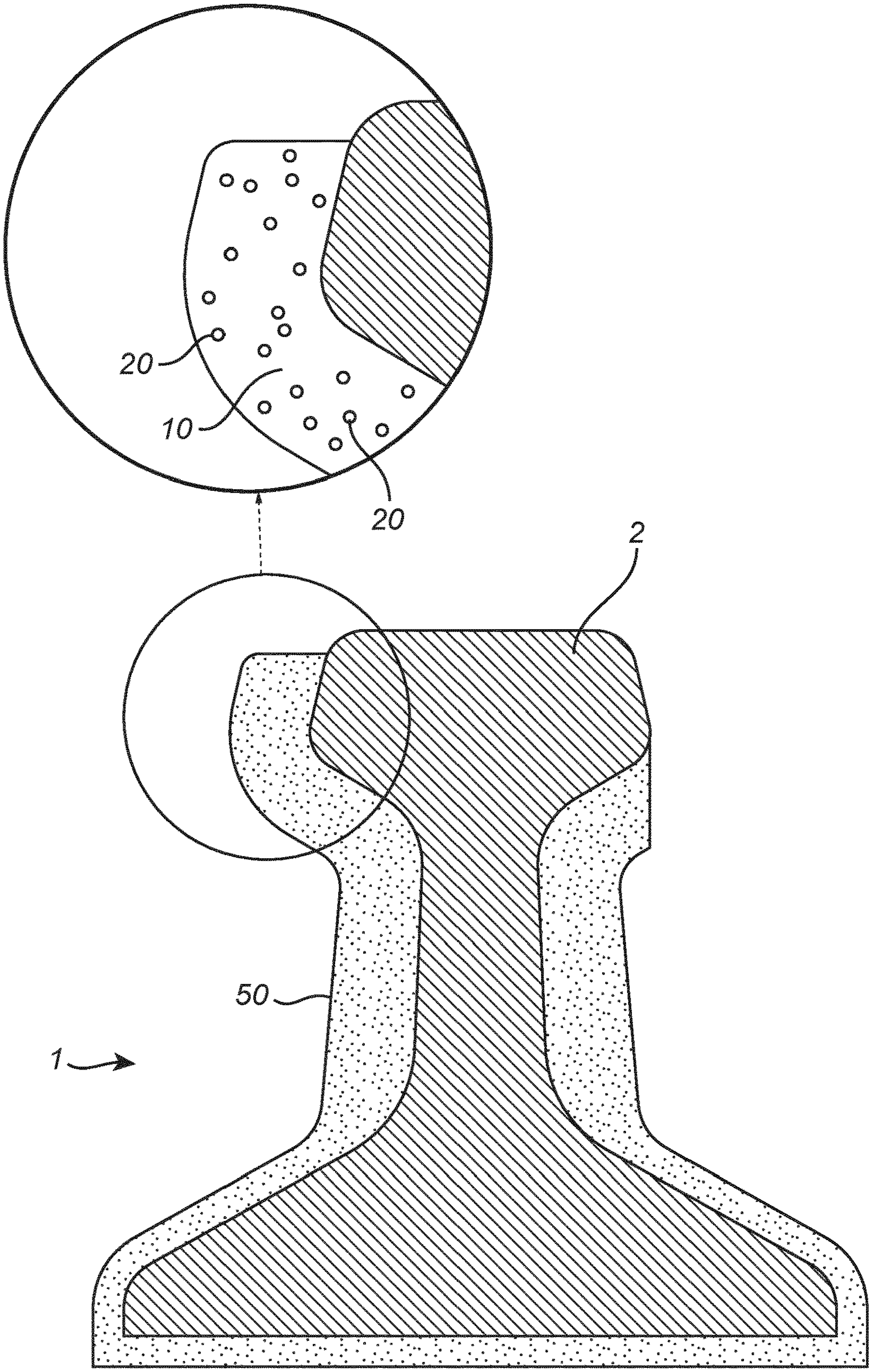
FIG. 1 illustrates a noise damper in the form of a rail boot attached to a rail.

FIG. 1 illustrates a noise damper 1, in the form of a rail boot 50, attached to a vibrating element 2, in the form of a rail 52. The rail boot 50 comprises a polymer matrix 10 in which hollow particles 20 are dispersed, as seen in the enlarged portion of the figure. The rail boot 50 in the figure has a shape which conforms to the surface of the rail 52.

Figure 2:
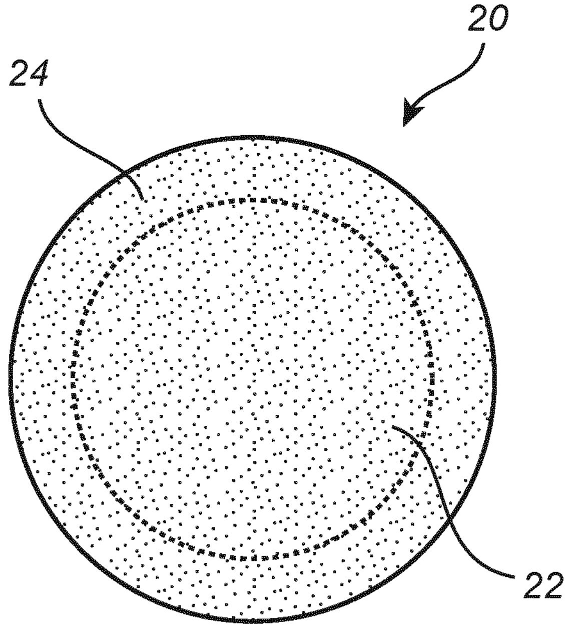
FIG. 2 illustrates a hollow particle.
Figure 3:
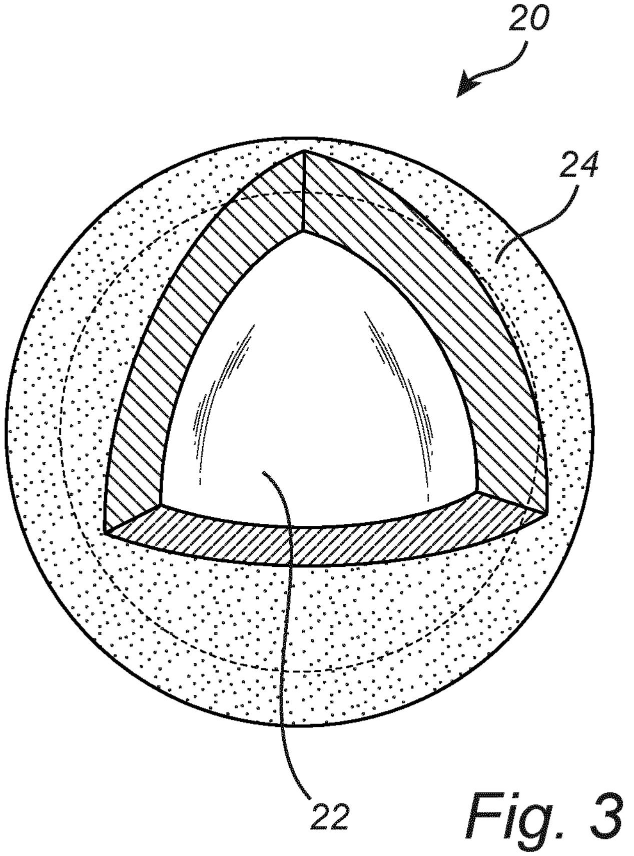
FIG. 3 illustrates a hollow particle.

FIGS. 2 and 3 illustrates a hollow particle 20 having a shell 24 encapsulating a gas filled cavity 22. FIG. 2 illustrates a semi-transparent hollow particle 20 while FIG. 3 illustrates a semi-transparent hollow particle 20 wherein a portion of the shell 24 has been cut out for illustrative purposes. However, in a hollow particle 20 according to the inventive concept, the shell 24 fully encapsulates the cavity 22. One example of a hollow particles 20 is Expancel particles which have a polymer shell. Another example of hollow particles 20 is Deep Springs Technology particles which may have a shell of e.g. glass, oxide ceramics, carbides etc. Another example of hollow particles 20 is 3M glass bubbles like iM16K.

Figure 4:
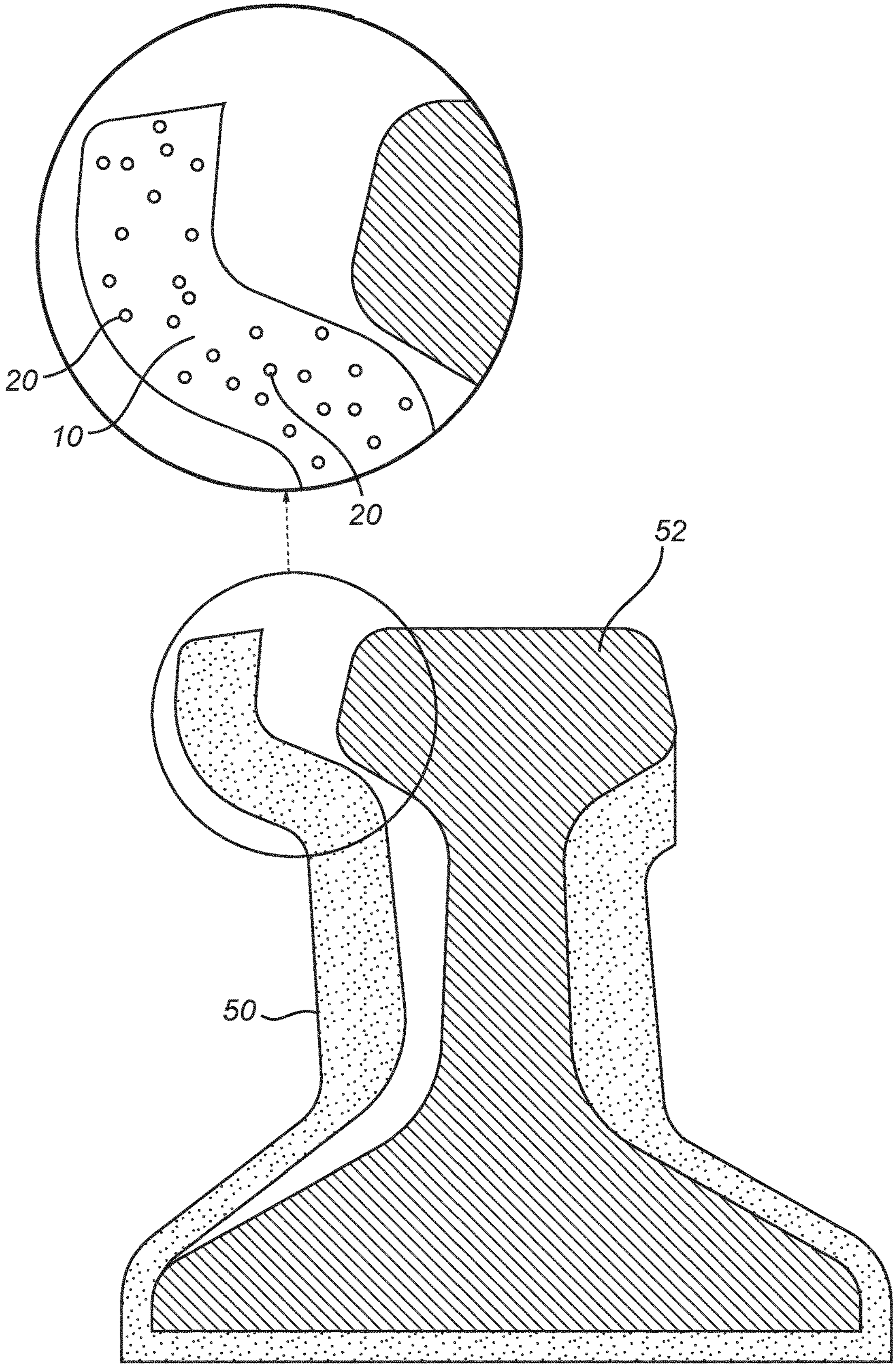
FIG. 4 illustrates a rail boot being clipped on to a rail.

FIG. 4 illustrates a rail boot 50 being clipped on to the rail 52. The polymer matrix 10 into which the hollow particles 20 are dispersed herein offers enough flexibility for the rail boot 50 to be distorted during the installation process. Once installed, the rail boot 50 reverts to its original form and grips the rail 52 by embracing the rail 52 tightly. Thus the rail boot 50 works as a vibrational element clip which may be attached to the vibrating element by clipping it on to the vibrating element.

Figure 5:
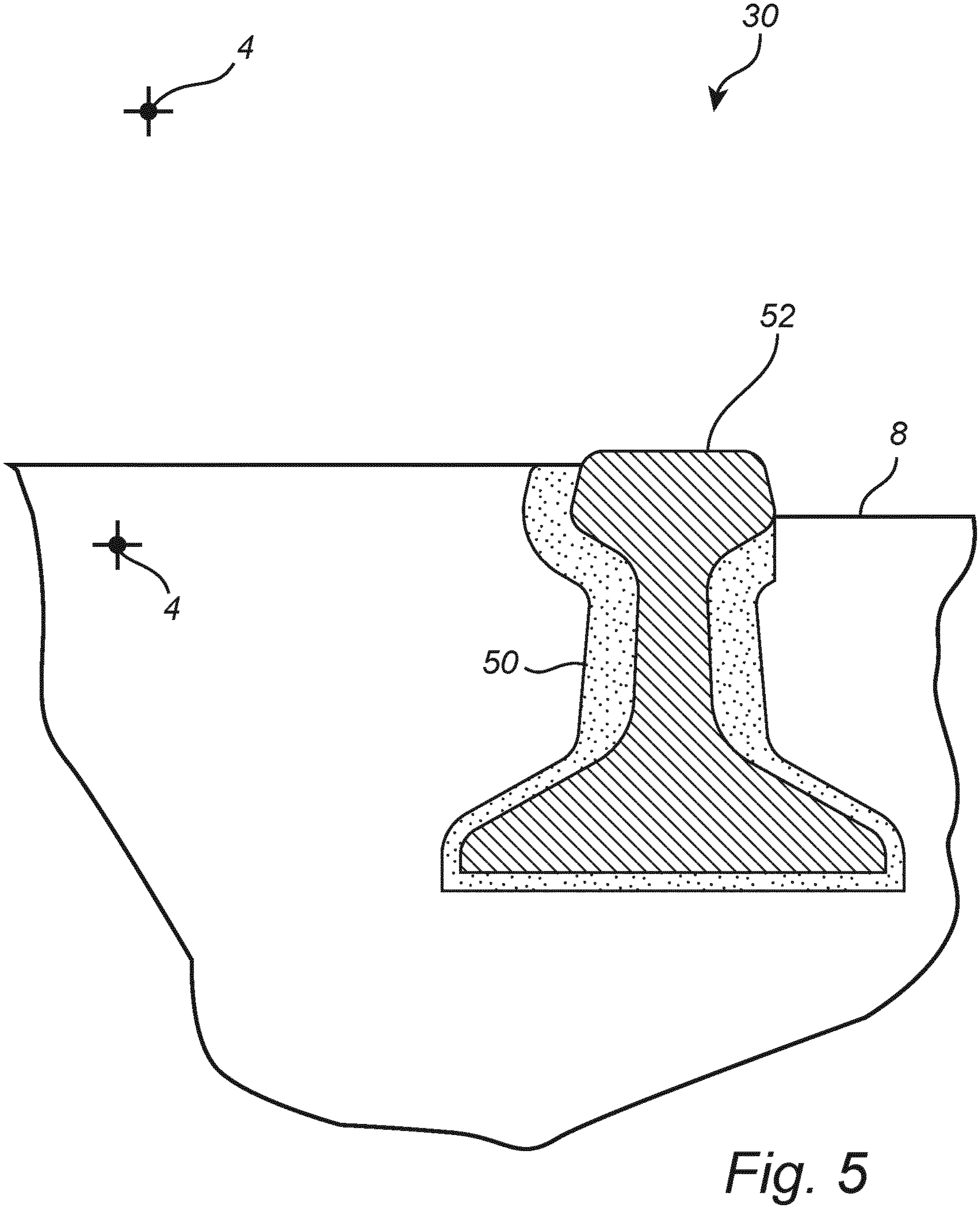
FIG. 5 illustrates a rail boot attached to a rail which is partially encased in a concrete roadway.

FIG. 5 illustrates a rail boot 50 according to the inventive concept. The rail boot 50 in the figure is attached to a rail 52 and the rail 52 with the rail boot 50 is partially encased in a concrete roadway 8. Thus, the rail 52, the rail boot 50 and the concrete roadway 8 forms a vibration isolation system 30. The amplitude of vibrations transmitted from the rail 52 to the concrete roadway 8 may thus be reduced. When the rail 52, with the rail boot 50 attached, is encased in the concrete roadway 8, the noise amplitude at a point 4 in the surrounding of the rail 52 is given by an attenuation factor times the noise amplitude in the surrounding when the rail 52, without the rail boot 50 attached, is encased in the concrete roadway 8. The point 4 in the surrounding of the rail 52 may be a point 4 in the concrete roadway 8, in the ground adjacent to the concrete roadway 8, or a point 4 in the air in the vicinity of the rail 52.

For the polymer matrix 10 of the rail boot 50 a variety of polymer matrixes 10 may be used. The polymer matrix 10 may e.g. be a thermoplastic polymer. The polymer matrix 10 may e.g. be TPS (styrenic block copolymers), TPU (thermoplastic polyurethanes), or TPV (thermoplastic vulcanizates). The hollow particles 20 may have a shell 24 made of e.g. a thermoplastic polymer. The shell 24 may encapsulate a hydrocarbon gas, e.g. isopentane. Examples of hollow particles are Expancel particles, e.g. Expancel 920 MB 120, Expancel 950 MB 80, and Expancel 930 MB 120. Other examples are Deep Springs Technology particles or 3M glass bubbles.

Figure 6:
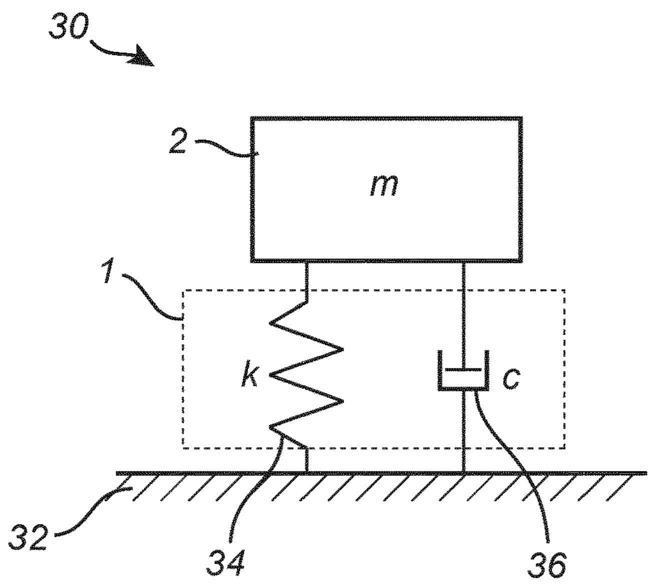
FIG. 6 illustrates a vibration isolation system.

The hollow particle size and the hollow particle concentration in the polymer matrix 10 may be customized to an expected vibrational frequency such that the attenuation factor is set below an attenuation factor threshold. FIG. 6 illustrates a model of a vibration isolation system 30. The vibration isolation system 30 comprises a vibrating element 2 with mass m, a noise damper 1 according to the inventive concept, and an object 32, wherein the noise damper 1 is attached both to the vibrating element 2 and the object 32. The noise damper 1 may herein be modelled as a spring 34 with stiffness k and a dash-pot 36 with damping coefficient C. The hollow particle size and the hollow particle concentration may affect k and C and thereby control the properties of the vibration isolation system, e.g. the natural frequency ($f_n$), and the transmissibility (T), of the system.

Figure 7:
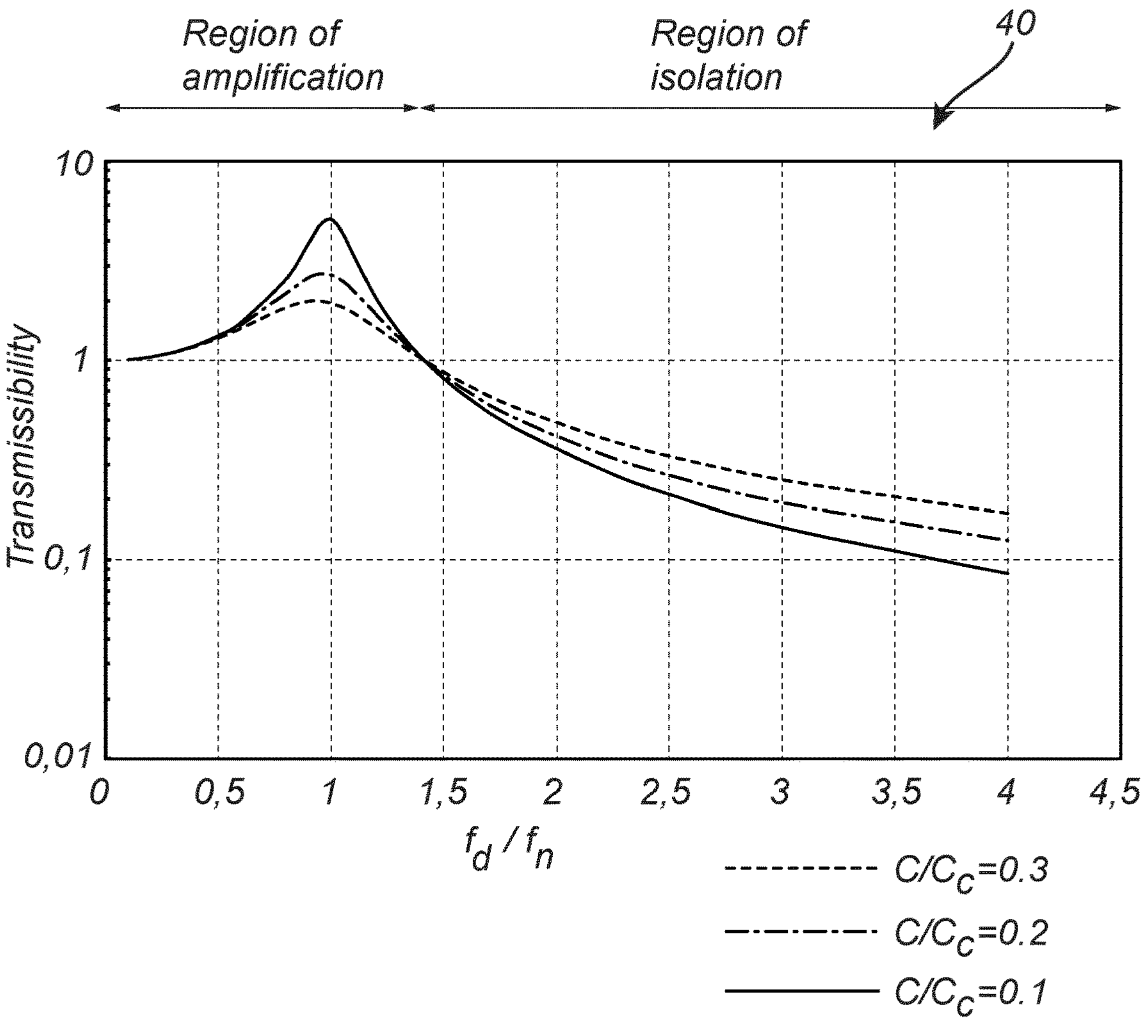
FIG. 7 illustrates a transmissibility curve.

FIG. 7 illustrates transmissibility curves 40 for three vibration isolation systems 30. The figure illustrates that the ratio between the vibrational frequency ($f_d$) and the natural frequency determines if the vibration isolation system is in the region of isolation or amplification. When $f_d/f_n>\sqrt{2}$ the vibration isolation system is in the region of isolation wherein $T<1$. Lower stiffness and higher damping coefficient may reduce the natural frequency such that the vibration isolation system 30 operates in the region of isolation. If the vibrational frequency is so low that it is not possible to shift the vibration isolation system 30 into the region of isolation the magnitude of the amplification in the region of amplification may be reduced by increasing the ratio between the damping coefficient (C) and the critical damping coefficient ($C_c$). The figure illustrates that increasing the $C/C_c$ ratio reduces the transmissibility in the region of amplification.

Figure 8:
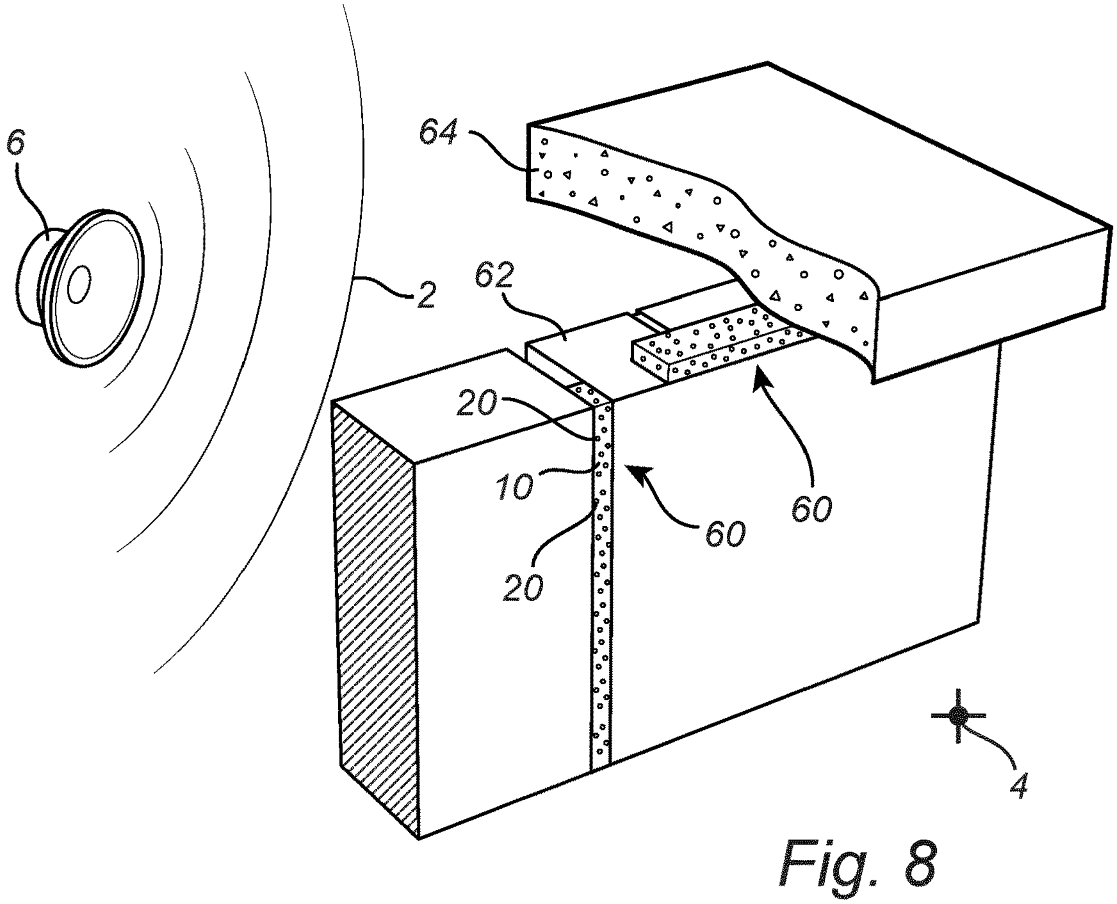
FIG. 8 illustrates noise dampers in the form of expansion joints.

FIG. 8 illustrates noise dampers 1 in the form of expansion joints 60. The expansion joints 60 acts as acoustic attenuators placed in the gaps between e.g. two wall segments 62 or a wall segment 62 and a ceiling segment 64 in a building. A noise source 6 on one side of the wall creates a sound wave which has to go through the expansion joint 60 to reach the other side. The hollow particle size and the hollow particle concentration are configured to set the acoustic attenuation coefficient of the expansion joint 60 above an acoustic attenuation coefficient threshold at the vibrational frequency of the vibrating element, the vibrating element being the air at the side of the wall facing the noise source 6. By setting the acoustic attenuation coefficient of the expansion joint 60 above the acoustic attenuation coefficient threshold at the vibrational frequency it is possible to ensure that with a given thickness a certain acoustic attenuation coefficient may be achieved.

Figure 9:
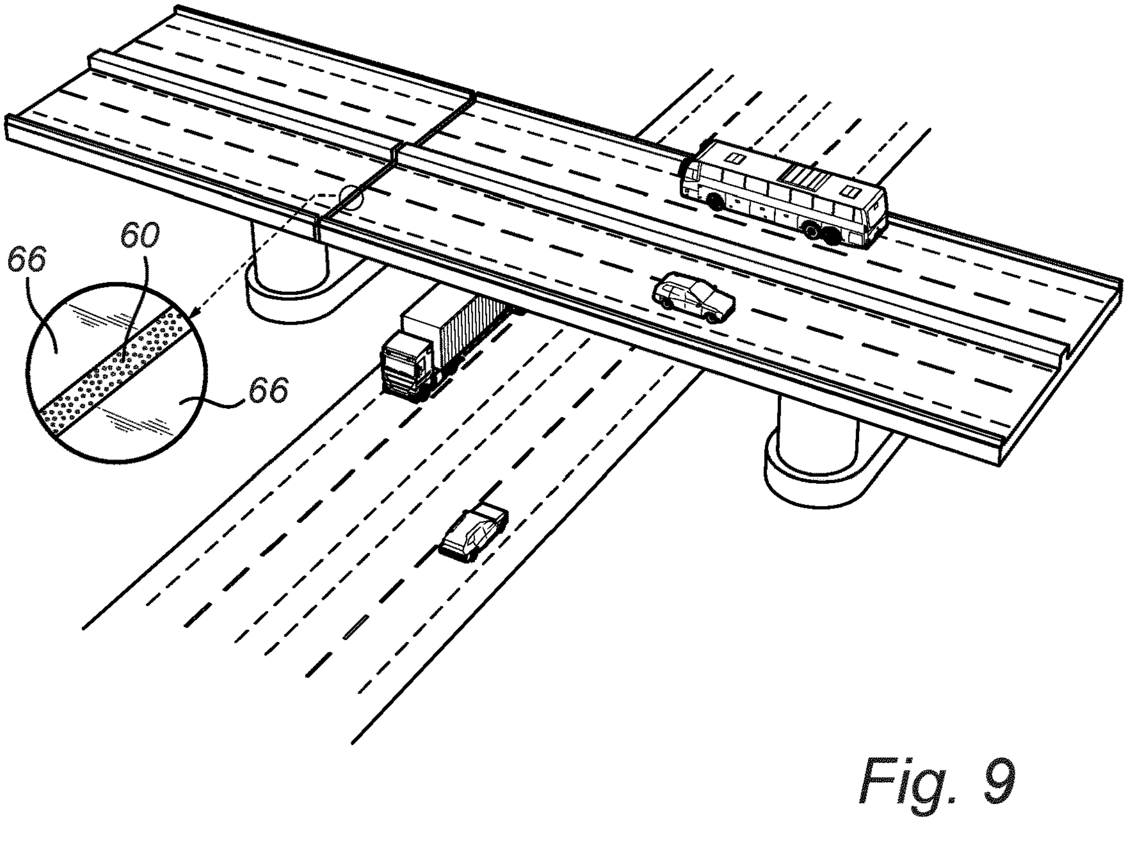
FIG. 9 illustrates a noise damper in the form of an expansion joints for a bridge.

FIG. 9 illustrates a noise damper 1 in the form of an expansion joint 60 for a bridge. The expansion joint 60 is placed in a gap between two road segments 66 of a bridge. The expansion joint 60 in the figure may act as part of a vibration isolation system which absorbs mechanical vibrations at the joint of the road segments 66. The expansion joint 60 in the figure may also act as an acoustic attenuator preventing acoustic noise from passing between the two road segments 66. The expansion joint 60 may be optimized for a mechanical vibrational frequency, e.g. an expected frequency originating from vehicles or pedestrians travelling on the bridge. The expansion joint 60 may also be optimized for an acoustic frequency, e.g. a resonant frequency of the space below the bridge or an expected frequency originating from vehicles travelling below the bridge.

Figure 10:
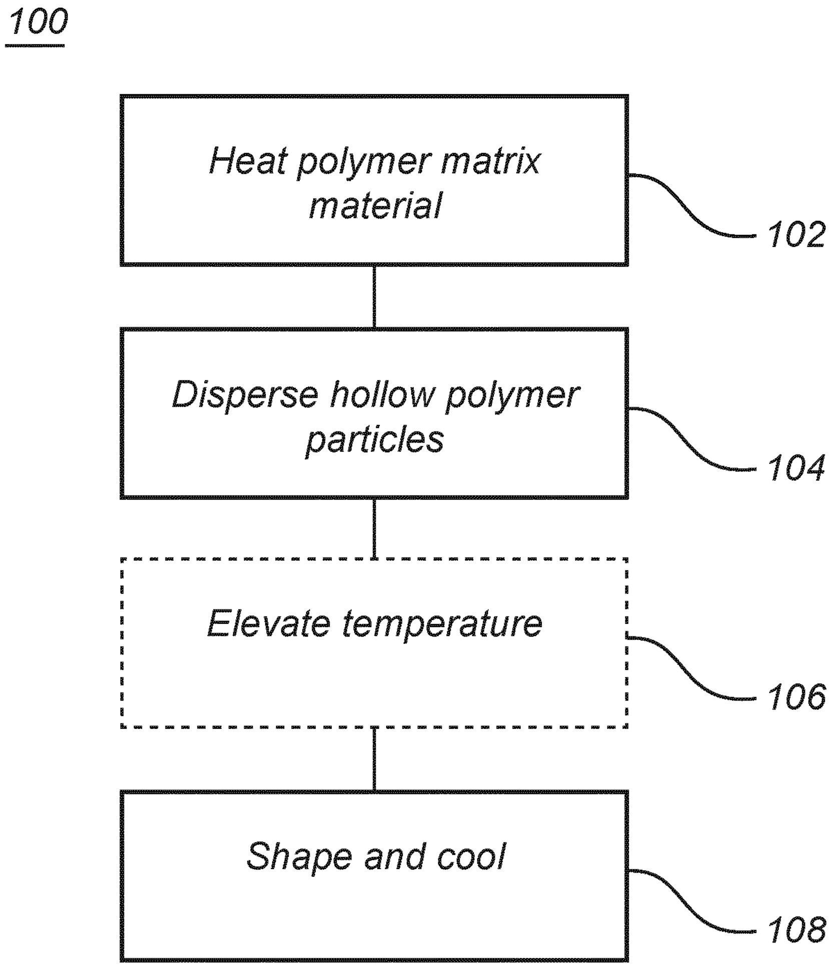
FIG. 10 illustrates a method for producing a noise damper.

FIG. 10 illustrates a method 100 for producing a noise damper 1. The method 100 comprises the step of heating 102 polymer matrix material such that it melts and forms a melted polymer matrix material. The polymer matrix material may herein be e.g. TPS, TPU, or TPV. The method 100 further comprises the step of dispersing 104 an amount of hollow particles 20 in the melted polymer matrix material.

The hollow particles 20 may be of a fixed size wherein the size of the particles does not change substantially from the point when they are mixed into the melted polymer matrix material to the point when the melted polymer matrix material has solidified. However, in some embodiments the hollow particles 20 are temperature expandable particles. An example of temperature expandable particles is Expancel particles. Temperature expandable particles expand when subjected to heat. The heat may herein soften the shell 24 and expand the gas in the gas filled cavity 24. The temperature expandable particles have a start temperature at which expansion starts and a max temperature at which the temperature expandable particles starts to degrade through e.g. rupture.

In an optional step of the method 100 the temperature of the melted polymer matrix material with the dispersed hollow particles 20 is elevated 106 to a size defining temperature. The size defining temperature herein lies between the start temperature and the max temperature.

In a further step of the method 100 the melted polymer matrix material with the dispersed hollow particles 20 is shaped and cooled 108 such that the melted polymer matrix material solidifies into a polymer matrix 10 with a shape.

According to the method 100 the amount of polymer matrix material and the amount of hollow particles 20 are configured to define the hollow particle concentration in the solidified polymer matrix 10. According to the method 100 the size of the hollow particles 20 in the finished noise damper 1 may be the same as the size of the hollow particles 20 when they were dispersed 104 in the melted polymer matrix material. When temperature expandable particles are used the size of the hollow particles 20 in the finished noise damper 1 may be defined by the size defining temperature. It should be understood that the size defining temperature may be the highest temperature the hollow particles 20 during the production of the noise damper 1.

In one embodiment an extrusion process is used to implement the method 100. Herein the steps of heating 102 an amount of polymer matrix material and dispersing 104 an amount of hollow particles 20 in the melted polymer matrix material are performed by feeding a barrel of an extruder with polymer matrix material and unexpanded hollow particles 20 and elevating the temperature in the barrel above the melting temperature of the polymer matrix material. In the extruder one or more screws may provide heat through shear heating to melt the polymer matrix material. The screw/screws may also mix the melted polymer matrix material with the hollow particles 20 as well as force the mixture towards an extruder die. Herein the extruder die is an opening where the melted polymer matrix material with the dispersed hollow particles leaves the extruder, the opening defining the shape of cross-section of the extruded noise damper 1. It may be advantageous to use a single screw extruder to avoid too high shear forces which may rupture the hollow particles 20. However, a twin screw extruder or a melt pump extruder may also be used.

In the extrusion process the step of elevating 106 the temperature of the melted polymer matrix material with the dispersed hollow particles 20 is performed at the extruder die. The temperature may be controlled by heating elements at the barrel and at the at the extruder die. The barrel may be kept at a lower temperature than the extruder die such that the temperature of the melted polymer matrix material with the dispersed hollow particles 20 is elevated as the melted polymer matrix material passes the extruder die. The temperature in the barrel may be set e.g. slightly above the start temperature and the temperature at the extruder die may be set between the start temperature and the max temperature or between the barrel temperature and the max temperature.

In the above the inventive concept has mainly been described with reference to a limited number of examples. However, as is readily appreciated by a person skilled in the art, other examples than the ones disclosed above are equally possible within the scope of the inventive concept, as defined by the appended claims.

What is claimed is:

1. A noise damper for reducing noise from a vibrating element which vibrates at a vibrational frequency, wherein the noise damper is configured to be in contact with the vibrating element such that when the noise damper is in contact with the vibrating element a noise amplitude at a point in a surrounding of the vibrating element is given by an attenuation factor times the noise amplitude at the point in the surrounding when the noise damper is disconnected from the vibrating element, the noise damper comprising:

a polymer matrix, the polymer matrix being in a solid phase and forming a shape;

a plurality of hollow particles dispersed in the polymer matrix, each hollow particle being a temperature expandable particle having a polymer shell encapsulating a gas filled cavity, each hollow particle having a hollow particle size, and the plurality of hollow particles being dispersed at a hollow particle concentration in the polymer matrix;

wherein the hollow particle size and the hollow particle concentration are configured to set the attenuation factor below an attenuation factor threshold at the vibrational frequency of the vibrating element, the hollow particle size being in a range of 20 μm to 2000 μm and the attenuation factor threshold being 0.9, wherein the polymer matrix with the dispersed hollow particles has a tan delta between 0.1 and 15, wherein tan delta is the loss modulus divided by the storage modulus for a viscoelastic material.

2. The noise damper of claim 1, wherein the attenuation factor is frequency dependent and the hollow particle size and the hollow particle concentration are further configured to set the attenuation factor to have a local minimum within a first vibrational interval, said first vibrational interval comprising the vibrational frequency of the vibrating element, said first vibrational interval being the vibrational frequency ±10% of the vibrational frequency.

3. The noise damper of claim 2, wherein the noise damper is configured to act as an acoustic attenuator which attenuates a sound wave originating from the vibrating element as the sound wave is transmitted through the noise damper when it is in contact with the vibrating element, wherein the hollow particle size and the hollow particle concentration are further configured to set an acoustic attenuation coefficient of the noise damper above an acoustic attenuation coefficient threshold at the vibrational frequency of the vibrating element.

4. The noise damper of claim 2, wherein the noise damper is a rail boot, the rail boot being configured to be attached to a rail of a railroad, wherein the rail is the vibrating element.

5. The noise damper of claim 1, wherein the noise damper is configured to act as an acoustic attenuator which attenuates a sound wave originating from the vibrating element as the sound wave is transmitted through the noise damper when it is in contact with the vibrating element wherein the hollow particle size and the hollow particle concentration are further configured to set an acoustic attenuation coefficient of the noise damper above an acoustic attenuation coefficient threshold at the vibrational frequency of the vibrating element, wherein the acoustic attenuation coefficient threshold is 0.023 $mm^{-1}$.

6. The noise damper of claim 5, wherein the acoustic attenuation coefficient is frequency dependent and the hollow particle size and the hollow particle concentration are further configured to set the acoustic attenuation coefficient to have a local maximum within a second vibrational interval, said second vibrational interval comprising the vibrational frequency of the vibrating element, said second vibrational interval being the vibrational frequency ±10% of the vibrational frequency.

7. The noise damper of claim 6, wherein the noise damper is configured to act as a part of a vibration isolation system, the noise damper being configured to be attached to an object as well as to the vibrating element, wherein the noise damper, the vibrating element and the object together form the vibration isolation system when the noise damper is attached both to the vibrating element and the object, the vibration isolation system controlling an amplitude of vibrations transmitted from the vibrating element to the object.

8. The noise damper of claim 1, wherein the noise damper is configured to act as a part of a vibration isolation system, the noise damper being configured to be attached to an object as well as to the vibrating element, wherein the noise damper, the vibrating element and the object together form the vibration isolation system when the noise damper is attached both to the vibrating element and the object, the vibration isolation system controlling an amplitude of vibrations transmitted from the vibrating element to the object.

9. The noise damper of claim 8, wherein the hollow particle size and the hollow particle concentration are further configured to set a natural frequency of the vibration isolation system such that the ratio between the vibrational frequency and the natural frequency of the vibration isolation system is above a frequency ratio threshold of $\sqrt{2}$.

10. The noise damper of claim 9, wherein the hollow particle size and the hollow particle concentration are further configured to set a transmissibility of the vibration isolation system at the vibrational frequency below a transmissibility threshold, the transmissibility threshold being 0.9, wherein the transmissibility is the ratio of an amplitude of a vibrational response and an amplitude of a vibrational input of the vibration isolation system.

11. The noise damper of claim 9, wherein the hollow particle size and the hollow particle concentration are further configured to set a damping ratio above a damping ratio threshold, the damping ratio threshold being 0.1, wherein the damping ratio is the ratio between the damping coefficient and the critical damping coefficient of the vibration isolation system.

12. The noise damper of claim 8, wherein the hollow particle size and the hollow particle concentration are further configured to set a transmissibility of the vibration isolation system at the vibrational frequency below a transmissibility threshold, the transmissibility threshold being 0.9, wherein the transmissibility is the ratio of an amplitude of a vibrational response and an amplitude of a vibrational input of the vibration isolation system.

13. The noise damper of claim 12, wherein the hollow particle size and the hollow particle concentration are further configured to set a damping ratio above a damping ratio threshold, the damping ratio threshold being 0.1, wherein the damping ratio is the ratio between the damping coefficient and the critical damping coefficient of the vibration isolation system.

14. The noise damper of claim 8, wherein the hollow particle size and the hollow particle concentration are further configured to set a damping ratio above a damping ratio threshold, the damping ratio threshold being 0.1, wherein the damping ratio is the ratio between the damping coefficient and the critical damping coefficient of the vibration isolation system.

15. The noise damper of claim 1, wherein the noise damper is a rail boot, the rail boot being configured to be attached to a rail of a railroad, wherein the rail is the vibrating element.

16. The noise damper of claim 1, wherein the hollow particle size has been set by elevating the temperature of the hollow particles to a size defining temperature during the production of the noise damper, the size defining temperature being a temperature which expands the hollow particles to a predefined size.

17. The noise damper of claim 1, wherein the noise damper is a vibrational element clip, wherein the shape of the polymer matrix has a form which grips the vibrating element such that the vibrational element clip is configured to be attached to the vibrating element by clipping it on to the vibrating element.

18. The noise damper of claim 1, wherein the vibrating element is a vibrating element of a submarine, and wherein the noise damper is arranged in contact with the vibrating element of the submarine.

19. A method for producing a noise damper for reducing noise from a vibrating element which vibrates at a vibrational frequency, wherein the noise damper is configured to be in contact with the vibrating element such that when the noise damper is in contact with the vibrating element a noise amplitude at a point in a surrounding of the vibrating element is given by an attenuation factor times the noise amplitude at the point in the surrounding when the noise damper is disconnected from the vibrating element, the method comprising:

heating an amount of a polymer matrix material such that it melts and forms a melted polymer matrix material;

dispersing an amount of hollow particles in the melted polymer matrix material;

wherein each hollow particle has a shell encapsulating a gas filled cavity, and wherein each hollow particle is a temperature expandable particle which is expandable to a size which is temperature dependent;

elevating the temperature of the melted polymer matrix material with the dispersed hollow particles to a size defining temperature such that the hollow particles expand, wherein the size defining temperature is configured to define the hollow particle size in the solidified polymer matrix;

shaping and cooling the melted polymer matrix material with the dispersed hollow particles such that the melted polymer matrix material solidifies into a polymer matrix with a shape, the shape comprising a plurality of the hollow particles with a hollow particle size dispersed at a hollow particle concentration in the polymer matrix;

wherein the amount of polymer matrix material and the amount of hollow particles are configured to define the hollow particle concentration in the solidified polymer matrix, wherein the hollow particle size and the hollow particle concentration are configured to set the attenuation factor below an attenuation factor threshold at the vibrational frequency of the vibrating element, the attenuation factor threshold being 0.9, the hollow particle size and the hollow particle concentration being further configured such that the polymer matrix with the dispersed hollow particles has a tan delta between 0.1 and 15, wherein tan delta is the loss modulus divided by the storage modulus for a viscoelastic material.

20. The method for producing a noise damper according to claim 19, wherein an extrusion process is used in which:

wherein heating an amount of polymer matrix material and dispersing an amount of hollow particles in the melted polymer matrix material are performed by feeding a barrel of an extruder with polymer matrix material and unexpanded hollow particles and elevating the temperature in the barrel above the melting temperature of the polymer matrix material; and wherein elevating the temperature of the melted polymer matrix material with the dispersed hollow particles to a size defining temperature is performed at an extruder die of the extruder wherein the die is a point where the melted polymer matrix material with the dispersed hollow particles leaves the extruder.

* * * * *